United States Patent
Laeske (10) Patent No.: US 11,751,516 B2
(45) Date of Patent: Sep. 12, 2023

(54) METHOD FOR THE AUTOMATED OPERATION OF A GREENHOUSE, SUPPLY FACILITY AND AUTOMATED GREENHOUSE

(71) Applicant: Swisslog AG, Buchs/Aarau (CH)

(72) Inventor: Kirt Laeske, Lahr (DE)

(73) Assignee: Swisslog AG, Buchs/Aarau (CH)

( * ) Notice: Subject to any disclaimer, the term of this patent is extended or adjusted under 35 U.S.C. 154(b) by 0 days.

(21) Appl. No.: 17/988,324

(22) Filed: Nov. 16, 2022

(65) Prior Publication Data

US 2023/0075956 A1 Mar. 9, 2023

Related U.S. Application Data

(62) Division of application No. 16/991,334, filed on Aug. 12, 2020, now Pat. No. 11,533,858.

(51) Int. Cl.
*A01G 9/14* (2006.01)
*A01G 9/24* (2006.01)

(52) U.S. Cl.
CPC .......... *A01G 9/143* (2013.01); *A01G 9/1423* (2013.01); *A01G 9/246* (2013.01); *A01G 9/247* (2013.01); *A01G 9/249* (2019.05)

(58) Field of Classification Search
CPC ........ A01G 9/143; A01G 9/249; A01G 31/06; A01G 7/045
See application file for complete search history.

(56) References Cited

U.S. PATENT DOCUMENTS

| 4,163,342 | A | * | 8/1979 | Fogg | A01G 9/249 |
| | | | | | 47/DIG. 6 |
| 7,594,355 | B1 | | 9/2009 | Aagaard | |
| 2007/0144068 | A1 | | 6/2007 | Feng | |
| 2010/0126063 | A1 | | 5/2010 | Emoto | |
| 2015/0282437 | A1 | | 10/2015 | Ohara et al. | |
| 2018/0014487 | A1 | * | 1/2018 | Tinsley | A01G 9/12 |
| 2018/0125016 | A1 | | 5/2018 | Dufresne | |
| 2018/0168111 | A1 | | 6/2018 | Yasukuri | |
| 2018/0213735 | A1 | | 8/2018 | Vail et al. | |
| 2018/0235156 | A1 | | 8/2018 | Blair et al. | |
| 2018/0325038 | A1 | | 11/2018 | Spiro | |
| 2018/0359946 | A1 | | 12/2018 | Rossi | |
| 2020/0120884 | A1 | | 4/2020 | Zhan et al. | |

(Continued)

FOREIGN PATENT DOCUMENTS

| CN | 207340466 U | 5/2018 |
| EP | 3453252 A1 | 3/2019 |

(Continued)

OTHER PUBLICATIONS

European Patent Office; Search Report in related European Patent Application No. 19191784.8 dated Feb. 19, 2020; 10 pages.

*Primary Examiner* — Yvonne R Abbott-Lewis
(74) *Attorney, Agent, or Firm* — Dorton & Willis, LLP (57) ABSTRACT

A method for the automated operation of a greenhouse which has at least one first plant growth room which is operated without artificial lighting and which has at least one second plant growth room which is different from the first plant growth room and which is equipped with artificial light sources for generating artificial light. An associated supply device and an associated greenhouse can be operated automatically.

12 Claims, 6 Drawing Sheets

(56) References Cited

U.S. PATENT DOCUMENTS

| | | |
|---|---|---|
| 2020/0236883 A1 | 7/2020 | Ambrosi |
| 2020/0260673 A1* | 8/2020 | Travaglini ............. A01G 31/06 |
| 2021/0185955 A1 | 6/2021 | Sakaguchi et al. |
| 2021/0204499 A1 | 7/2021 | Fujisawa et al. |
| 2021/0360887 A1 | 11/2021 | Neri et al. |

FOREIGN PATENT DOCUMENTS

| | | |
|---|---|---|
| WO | 2013165248 A1 | 11/2013 |
| WO | 2017167436 A1 | 10/2017 |
| WO | 2019109006 A1 | 6/2019 |

* cited by examiner

METHOD FOR THE AUTOMATED OPERATION OF A GREENHOUSE, SUPPLY FACILITY AND AUTOMATED GREENHOUSE

CROSS-REFERENCE TO RELATED APPLICATIONS

This application is a divisional of U.S. patent application Ser. No. 16/991,334, filed Aug. 12, 2020 (pending), which claims the benefit of priority under 35 U.S.C. § 119(a) to European Patent Application No. 19191784.8, filed Aug. 14, 2019 (pending), the disclosures of which are incorporated by reference in their entirety.

TECHNICAL FIELD

The invention relates to a method for the automated operation of a greenhouse, as well as an associated supply device and an associated automatically operated greenhouse.

BACKGROUND

WO 2019/109006 A1 describes a system for the production of agricultural foodstuffs in buildings with several floors, the so-called vertical farms.

SUMMARY

The object of the invention is to create a method for the automated operation of a greenhouse which enables the production of agricultural foodstuffs in buildings in a particularly economical manner, in particular with low personnel requirements with high energy efficiency. Further objects of the invention are to provide a corresponding supply device and a greenhouse with which the method according to the invention can be carried out in an automated manner.

The object is achieved by a method for the automated operation of a greenhouse which has at least one first plant growth room which is operated without artificial lighting and which has at least one second plant growth room which is different from the first plant growth room and which is equipped with artificial lighting means for generating artificial light, comprising the steps:

automatically transporting back and forth of at least one plant carrier equipped with plants by means of an automatically controlled transport device between the first plant growth room and the second plant growth room, wherein the automatically controlled transport device is designed and set up as follows:

leaving the at least one plant carrier for the duration of a first time segment in the first plant growth space, so that the plants stored on the at least one plant carrier develop further in the first plant growth space for the duration of the first time segment without the influence of artificial light, and leaving the at least one plant carrier for the duration of a second time segment different from the first time segment in the second plant growth space, so that the plants stored on the at least one plant carrier develop further in the second plant growth space under the influence of artificial light for the duration of the second time segment.

The method according to the invention relates to the automated operation of a greenhouse. In particular, the method according to the invention is intended for vertical farming. In contrast to general agricultural greenhouses, which are generally operated on a single planting level and only use natural sunlight to grow the plants, vertical farming provides for the use of artificial light, so that based on the use of artificial light sources at several height levels, plants that are positioned on top of each other in several levels can thrive.

The technologies known so far for vertical farming are still in the development stage and are usually based on greenhouses that are operated on one or more levels. The plants are grown by aeroponics or hydroponics. In connection with lighting technology for plant growth and ventilation systems, the plants flourish until harvest within the building or on the shelf of the system, i.e. the greenhouses.

In the known shelf systems for vertical farming, automated technology is used in a manner very similar to high-bay storage technology for logistics systems. This technology, which includes manual or automatic storage and retrieval machines, handles shelf-mounted and interchangeable tubs in which the plants thrive. In order to harvest the plants, workers move on the storage and retrieval machines or the tubs are transported to the harvesting area using complex conveyor technology. The tub can be shell-like and/or closed-walled, that is to say watertight. The tubs contain the plant carrier or the plant carriers. The tubs remain in the greenhouse, where, however, the plant carriers can be removed from the tubs and, for example, removed during a harvest. The plant carriers can for example have a fixed frame, in particular an aluminum frame. The frame defines a grid on which the plants are arranged. The grid can be designed to be closely meshed.

In order to be able to operate the use of technologies similar to warehouse technology economically, it is necessary to use heights that are as high as possible, for example 8 to 20 meters, in order to get by with as few storage and retrieval devices as possible and with a small storage area. Stationary storage on the shelf also has the disadvantage that it is necessary to create different climate zones within a room. For example, it is necessary to generate day and night by having the lighting systems switched on for a few hours, i.e. in operation, and switched off, i.e. out of operation, for a few hours. For the optimum climate, the temperature and humidity of the air in the room must be regulated. In particular, in vertical farms (without intermediate ceilings) at very high heights, for example over 5 meters and more, it tends to be too warm at the upper height levels and too cold at lower height levels. This means that with known vertical farms it is difficult to achieve a nearly constant climate over a high height. With the technical solution according to the invention, room heights of, for example, 2.5 meters can be managed, so that the disadvantages mentioned cannot arise.

A new vertical farm usually has to be set up in newly built building complexes that are designed solely for this purpose. The use of existing buildings requires extensive floor renovations in order to be able to use automatic storage and retrieval machines. In order to be able to install high, automatable shelf structures, the warehouse floor would also have to adhere to narrow tolerances, for example according to applicable standards, such as FEM 9.841.

With the method for the automated operation of a greenhouse, a solution is created with which the production of agricultural foodstuffs in buildings is possible in a particularly economical manner, in particular with low personnel requirements and high energy efficiency. In particular, existing buildings, such as high-rise buildings or abandoned factories, especially in large cities, can be converted into alternative uses as greenhouses.

The invention provides, among other things, that artificial lighting is not permanently assigned to every plant or plant carrier and a day/night change is simulated by switching the artificial lighting on and off, but that the lighting means of the artificial lighting present according to the invention are preferably switched on permanently, that is, emit light and to simulate the day/night change, the plants or the plant carriers are automatically brought into the first plant growth room for the duration of the first time segment (simulated night time), which is operated without artificial lighting and for the duration of the second time segment (simulated time of day) are automatically brought into the second plant growth room, which is equipped with artificial light sources to generate artificial light.

The plants can in particular be plants that serve as food for living beings, for example vegetables, fruit, culinary herbs, tea plants. However, the plants can also be other useful plants, such as medicinal plants, cosmetic plants or aromatic plants.

The plant carrier located in the tub forms a receptacle for the required substrate on which the plants thrive. At the same time, the plant carrier has the function of carrying the plants planted in the substrate. The respective plant carrier can be designed to receive a single plant. Alternatively, the respective plant carrier can be designed to accommodate several plants at the same time, in particular the same plant species and/or plant variety. Several plant carriers can be arranged on the same level. Alternatively or in addition, several plant carriers can be arranged on several different height levels. The multiple plant carriers can in particular be placed in one or more tubs on a common mobile shelf stand and thereby be automatically transported together with the mobile shelf stand. Each tub can have one or more plant carriers.

At least one automatically controlled transport device is used for automatically transporting the tubs with plant carriers together with the shelf stand. The one transport device or the plurality of transport devices can be ground-based vehicles that are automatically navigated. The vehicles can be designed, for example, in the form of driverless transport systems (AGVs) known per se. Alternatively, the vehicles can be designed in the manner of mobile robots.

The automatic transport takes place according to one or more embodiments of the method according to the invention and can be controlled by a control device that is designed according to one or more embodiments of the method according to the invention and is set up accordingly to carry out the method, for example by means of a stored program. This can take place in that the control device controls the at least one transport device accordingly, moves it and at least navigates back and forth between the first plant growth space and the second plant growth space.

Transporting the at least one plant carrier back and forth by means of the transport device means optionally changing the current position and/or location of the plant carrier not only out of the first plant growth room and into the second plant growth room, but also changing the current position and/or location of the plant carrier out of the second plant growth room and into the first plant growth room. Furthermore, the back and forth transport also includes moving the at least one plant carrier to another room or station, such as the analysis station according to the invention or the loading station according to the invention, as well as retrieving the at least one plant carrier from another room or another station, such as from the analysis station according to the invention or from the loading station according to the invention.

The respective duration of the first time segment in which the plants develop further without the influence of artificial light in the first plant growth room, and the respective duration of the second time segment in which the plants develop further under the influence of artificial light in the second plant growth room can be determined individually. The respective duration of the first time segment and of the second time segment can be determined, for example, as a function of the plant species. The respective duration of the first time segment and the second time segment can, however, also be selected as a function of other parameters, such as, for example, the temperature and/or the humidity of the surroundings of the plants. This can vary depending on the type of plant. To simulate an average natural day/night rhythm, for example, the duration of the first time segment and the duration of the second time segment can each be set at 12 hours.

In the method according to the invention, an analysis station can be used in a greenhouse, which is designed to detect the biological state of plants with regard to at least one biological parameter, and the automatically controlled transport device is designed and set up to remove the at least one plant carrier from the first plant growth room or to automatically transport it from the second plant growth room to the analysis station, so that the plants stored on the at least one plant carrier can be recorded at the analysis station with regard to at least one biological parameter.

The analysis station can be its own analysis room which is separate from the first plant growth room and the second plant growth room. Alternatively, the analysis station can be integrated into the first plant growth room or the second plant growth room. The analysis station can also be located in a transfer path between the first plant growth room and the second plant growth room. The analysis station is in particular operated unmanned, i.e. operated automatically. The analysis station has appropriate sensors for this purpose, which record the required parameters. If these parameters are not met, the plant carrier and/or the shelf stand can be moved to a manual control station (e.g. to quarantine).

In general, any desired biological condition can be recorded, analyzed and evaluated at the analysis station. Depending on the detected, analyzed and/or assessed biological state, the control device can be set up to assign the plant carrier with the analyzed plants either to the first plant growth room or the second plant growth room or to assign the plant carrier to the loading station. The loading station can be designed to bring the plants or the plant carriers out of the greenhouse, be it for the intended use or for sorting out.

According to a further development of the method according to the invention, the growth state of the plants, pest infestation of the plants, a degree of moisture in the plant substrate of the plants and/or a nutrient content of the plant substrate of the plants can be recorded as biological parameters at the analysis station.

The control device of the greenhouse can be designed and set up, for example depending on the recorded, analyzed and/or assessed biological state of the growth state of the plants, the degree of moisture of the plant substrate of the plants and/or the nutrient content of the plant substrate of the plants, to automatically move the plant carriers by means of the transport devices for an extended duration or a shortened duration into the first or second plant growth room and, in particular in the case of the second plant growth room, to couple the plant carriers to the supply devices according to the invention in order to, depending on the recorded, analyzed and/or assessed biological state of the plants or the plant substrates, to supply more or less water, nutrient solution and/or conditioned air and/or to suction off used nutrient solution.

In the method according to the invention, the at least one plant carrier equipped with plants can be stored in a mobile shelf stand which has at least two storage levels for carrying plant carriers and an access opening between each two storage levels, and the mobile shelf stand can be transported by means of an automatically controlled, ground-based vehicle as a transport device into the second plant growth room, and the mobile shelf stand can be automatically moved by means of the vehicle to a supply device positioned in the second plant growth room, such that the supply means of the supply device reaches from the outside the mobile shelf stand via the access opening of the mobile shelf stand into the interior of the mobile shelf stand, so that the supply means of the supply device can supply the plants present in the plant carriers accordingly, as long as the mobile shelf stand is coupled to the supply device.

The mobile shelf stand can achieve its mobility in that it is designed in such a way that the mobile shelf stand can be driven under by one of the transport devices and the mobile shelf stand can be lifted by the transport device and automatically moved on a surface by automatically driving the transport device. The transport device can have a lifting device for this purpose. The transport device or the lifting device can be designed, for example, according to WO 2017/167436 A1.

The mobile shelf stand can have at least two or more storage levels. The storage levels are preferably arranged one above the other and vertically aligned with one another on the shelf stand. Each storage level can have a tub or each storage level or each storage level can be a tub in which one or more plant carriers can be stored. The plant carriers can be removed from the tubs. The plant carriers can, for example, have a frame and, as the bottom surface, a grid or a net, on which, for example, the plant substrate is applied. The plants grow in the plant substrate.

The mobile shelf stand can have feet so that a shelf stand that is not lifted by the transport device cannot be moved and the mobility of the shelf stand is only established when the shelf stand is raised by the transport device. Alternatively, the shelf stand can have rollers or wheels instead of feet, so that the shelf stand can be moved by means of the rollers or wheels without the shelf stand having to be lifted by a transport device. In such an embodiment, the shelf stand then forms a shelf trolley. The shelf trolley can, for example, be towed by an autonomous vehicle or pushed manually by a person.

The access opening or the access openings can already be formed by free spacings between the storage levels or the plant carriers on the shelf stand. This can be the case in particular when the shelf stand is formed only by shelves or rails that are positioned on preferably four vertical columns of the shelf stand and kept at a distance.

The one transport device or the plurality of transport devices can be ground-based vehicles that are automatically navigated. The vehicles can be designed, for example, in the form of driverless transport systems (AGVs) known per se. Alternatively, the vehicles can be designed in the manner of mobile robots.

Several supply devices can be provided. Several supply devices can each form a supply module, wherein the supply devices can be individual components of a modular system. Each supply device can be provided with standardized interfaces so that two or more supply devices can be linked together to form a network.

The supply means are devices that are attached to the supply device and are designed to supply the plants and the plant carriers, in particular the plant substrate in the plant carriers, with the corresponding operating means, such as air, water, light and nutrients, when the mobile shelf stand is coupled to the respective supply device.

If the supply means reach beyond the access openings of the mobile shelf stand into the interior of the mobile shelf stand, the plants or the plant carriers in the immediate vicinity can be supplied with the corresponding operating means, such as air, water, light and nutrients, in particular by, for example, the light, the water and the nutrients being applied from above to the plants or the plant substrate in the plant carriers.

In a first embodiment, the supply devices can be stationary supply devices which are permanently installed in the second plant growth space. For this purpose, a single supply device or several supply devices can be attached, for example, to a room wall of the second plant growth room or, in particular, facing away from each other, opposite to an intermediate wall that extends into the room of the second plant growth room.

In a second embodiment, the supply devices can be designed as mobile supply devices.

The mobile supply device can have feet, so that a supply device that has not been lifted by the transport device cannot be driven, but the mobility of the supply device occurs when the supply device is lifted by the transport device. Alternatively, the supply device can have rollers or wheels instead of feet, so that the supply device can be moved by means of the rollers or wheels without the supply device having to be lifted by a transport device. In such an embodiment, the supply device then forms a rolling supply device.

The object is also achieved by a supply device according to the invention for a greenhouse, comprising:
 a base support,
 at least two cantilever beams arranged at different heights on the base support, each of which has at least one supply means which is designed to act on a plant in a plant carrier when the plant support is coupled to the supply device,
 at least one operating means connection which is designed to supply at least one operating means provided from a supply network for supplying the plants to the supply means.

The base support can be formed, for example, by an at least substantially vertically extending rear wall. The base support or the rear wall can be made hollow, so that supply lines can run in the hollow base support or in the hollow rear wall, which lead to the cantilever supports, i.e. to the supply means.

The cantilever beams extend at least substantially horizontally away from the base support or the rear wall. The supply means are arranged on the respective underside of the cantilever beams. If a plant carrier is coupled to the supply device, then the cantilever beams and thus the supply means cover the plants and the plant substrate present in the plant carriers and the plants or the plant carriers can be supplied with the corresponding operating means, such as air, water, light and nutrients in close proximity, in particular in that, for example, the light, the water and the nutrients are applied from above to the plants or the plant substrate in the plant carriers and thereby act on the plants.

The operating means connection can have one or more plugs, sockets and/or couplings. Each plug, each socket and/or each coupling is designed according to its operating means to be transmitted. The operating means can in particular be composed of electrical energy, water, nutrient solutions and air. The electrical energy can not only serve to supply electrical light sources to generate the artificial light for the plants, but the electrical energy can also be used to, for example, automatically control valves for the water supply, for the fresh air supply or to open or close the suction of used nutrient solution. The electrical energy can also supply electrical heating means of the supply device, which heating means can be designed to preheat the water, the nutrient solution, or the air. The electrical energy can also be used to operate fans of the supply device.

The resources are electrical energy, water, the nutrient solution and/or air.

In a first embodiment, the operating means at the supply device can be electrical energy and the supply means can be at least one electrical lighting means, which is designed to be operated by the electrical energy to emit light in a light spectrum that promotes plant growth in a direction in which the plants are irradiated with this light when the plant carrier with the plants is coupled to the supply device.

At the supply device, in an alternative or supplementary second embodiment, the operating means can be water or a nutrient solution and the supply medium can be at least one outlet nozzle which is designed to deliver the water or the nutrient solution so that the plants or a plant substrate of the plants can receive the water or absorb the nutrient solution when the plant carrier with the plants is coupled to the supply device.

In an alternative or supplementary third embodiment, the operating means at the supply device can be a negative pressure and the supply medium can be at least one suction nozzle which is designed to suction up waste water or used nutrient solution from a plant substrate of the plants when the plant carrier with the plants is coupled to the supply device.

In an alternative or supplementary fourth embodiment, the operating means at the supply device can be conditioned air and the supply medium can be at least one air-conditioning nozzle which is designed to emit conditioned air, so that the plants are supplied with the conditioned air when the plant carrier with the plants is coupled to the supply device.

In all embodiments of the supply device, the operating means connection can have at least one coupling means which is designed to connect the at least one supply means of the supply device to a supply network in a state coupled to a counter-coupling means of a greenhouse or a further supply device, so that the operating means can be supplied to the plants via the supply means when the plant carrier with the plants is coupled to the supply device.

The coupling means can have one or more plugs, sockets and/or couplings. Each plug, each socket and/or each coupling is designed according to its operating means to be transmitted. The operating means can in particular be composed of electrical energy, water, nutrient solutions and air.

The counter-coupling means can comprise one or more plugs, sockets and/or couplings. Each plug, each socket and/or each coupling is designed according to its operating means to be transmitted. The operating means can in particular be composed of electrical energy, water, nutrient solutions and air. The counter-coupling means is designed to correspond to the coupling means, i.e. designed to interact with the coupling means in the plugged-together state, in such a way that the corresponding operating means can be transferred in the plugged-together state.

In the case of the supply device, the operating means connection can be formed by at least one coupling means and at least one counter-coupling means, so that two or more supply devices can be coupled to one another in series or in parallel in order to be able to supply the two or more supply devices with the operating means via a common supply network connection.

In the case of a serial arrangement of two or more supply devices, the supply devices can be set up next to one another and each connected via their coupling means and counter-coupling means one after the other for the transmission of the operating means. It is sufficient if a single one of the plurality of supply devices is directly connected to the supply network and the other supply devices in each case are indirectly supplied with the operating means via this one supply device directly connected to the supply network.

In the case of a parallel arrangement of several supply devices, the supply devices can be arranged, for example, on opposite sides of an intermediate wall, wherein the operating means are branched, so to speak, over two or more lines in groups to the several supply devices.

On the supply device, the at least two cantilever beams arranged at different heights on the base support can be formed by ceiling walls which protrude from the base beam in a horizontal plane and which have downward-facing wall surfaces, on which the at least one supply means is arranged and which are formed to cover, at least substantially, plant carriers of the transport device in each case assigned in a reference plane when the plant carrier with the plants is coupled to the supply device.

In a first embodiment variant, the ceiling walls can be designed to be closed and flat. In a modified second embodiment variant, the ceiling walls can be formed by individual struts or grid surfaces, which can then also have breakthroughs or openings.

The wall surfaces pointing downwards can accordingly also optionally be designed to be closed and planar or be formed by individual struts or grid surfaces of the ceiling walls, which can then also have breakthroughs or openings.

The object is also solved by an automated greenhouse, comprising:
   at least one first plant growth room that is designed to be operated without artificial lighting,
   at least one second plant growth room which is different from the first plant growth room and which is equipped with artificial lighting means for generating artificial light,
   at least one supply device arranged in the second plant growth space according to one or more of the embodiments described,
   at least one mobile shelf stand which has at least two storage levels for carrying plant carriers and an access opening between each two storage levels,
   at least one ground-based vehicle which is designed to receive the at least one mobile shelf stand, so that the mobile shelf stand can be transported back and forth between the first plant growth room and the second plant growth room by means of the floor-bound vehicle, and
   a control device which is designed and set up to automatically control the at least one ground-based vehicle and the at least one supply device arranged in the second plant growth room according to one or more of the embodiments described, such that the greenhouse according to one or more of the embodiments of the method according to the invention is operated automatically.

In a first development, the greenhouse can have an analysis station which is designed to detect the biological state of plants with regard to at least one biological parameter when a plant carrier with plants is positioned at the analysis station, wherein the analysis station has sensors which are designed to automatically detect as biological parameters the growth state of the plants, pest infestation of the plants, a degree of moisture in the plant substrate of the plants and/or a nutrient content of the plant substrate of the plants.

In a second development, the greenhouse can, as an alternative or in addition to an analysis station, have a loading station that is designed to automatically receive plants, plant carriers and/or mobile shelf stands into the greenhouse or automatically remove them from the greenhouse, wherein the control device is designed and set up to the to automatically transport mobile shelf stands from the first plant growth room or the second plant growth room to the loading station by means of the at least one ground-based vehicle and to automatically transport them back from the loading station to the first plant growth room or the second plant growth room.

The solution according to the invention is shown again in the following, in part in other words. The invention proposes a flexible shelf and transport system. A system consisting of vehicles (transport devices) and mobile shelf stands can be used as a basis for this. The basic system can comprise horizontally moving automatic moving units which are able to accommodate, transport and position mobile shelves. The shelves are tailored to the application. In addition to the mobile shelf, the solution provides in particular so-called supply modules, i.e. supply devices. The supply modules can contain all the supply lines for water, nutrient solution, lighting, ventilation, but also wastewater disposal required for the growth of the plant culture. The supply module can be designed singularly or as a regular matrix. For example, individual supply modules can be positioned along a wall or in the room as a doubled module (back to back). The supply modules can be coupled with one another so that only one decentralized supply and removal of media (e.g. electricity, water, etc.) is required for each row of shelves.

The system structure provides that the empty shelves are fed to a loading station, for example by means of a driverless transport system (AGV), transport vehicle or a mobile robot. In the loading station, the tubs in which the plant seeds in the plant carriers are introduced together with the substrate can be inserted manually or automatically into the mobile shelf. The transport vehicle moves the mobile shelf with the tubs, for example, into the germination area of the plant, where ideal conditions exist for the plant to germinate. After germination, the shelf is transferred, for example, to the plant's growth area by the transport vehicle. In the growing area there is an ideal climate for the young plants to grow further. The growing area can in turn be subdivided into bright, illuminated rooms and dark rooms. In the dark rooms there are no lights that the plant needs for growth. The lights necessary for growth are installed in the bright rooms. This allows the use of lights to be reduced and optimized.

In the course of the regular transport between "dark" and "light" rooms, which is called on during stationary process, the transport vehicles with the shelves pass through an identification station (analysis station). Here, the condition of the plants on the shelf can be checked and documented at a central point. Based on the determined condition of the plants on the mobile shelf, decisions can be made regarding further processing or special processes (e.g. sorting).

At the end of the growth phase, the shelves are brought to the harvesting station by the transport vehicle. There the plant carriers are unloaded from the tubs and the plants are harvested manually or automatically from the plant carrier. The tubs and the plant carrier (with growth flow) are sent for cleaning or disposal. The transport vehicle moves the mobile shelves back into the loading station.

In order to make the system as flexible as possible, all supply lines required for plant growth can be integrated in the supply module. These are connected to one another by means of suitable quick-connect systems. The transport vehicle transports the mobile shelves together with the tubs to the supply module and positions them there in such a way that the media supply is guaranteed.

The advantage of this system is, in addition to the high flexibility, also the modularity in the system structure, which enables small, medium or large systems to be built. The systems can be set up on one level or over several levels, with each level being self-sufficient. Due to the high modularity of the transport vehicle, of the mobile shelves, but also of the supply units, the system can be moved easily and flexibly and set up at another location. Due to the modularity, it is also possible to transport the shelf module completely to the consumer as fresh goods in a shopping center or in a catering business, for example.

A specific embodiment of the invention is explained in more detail in the following description with reference to the accompanying figures. Specific features of this exemplary embodiment can represent general features of the invention regardless of the specific context in which they are mentioned, possibly also considered individually or in further combinations.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
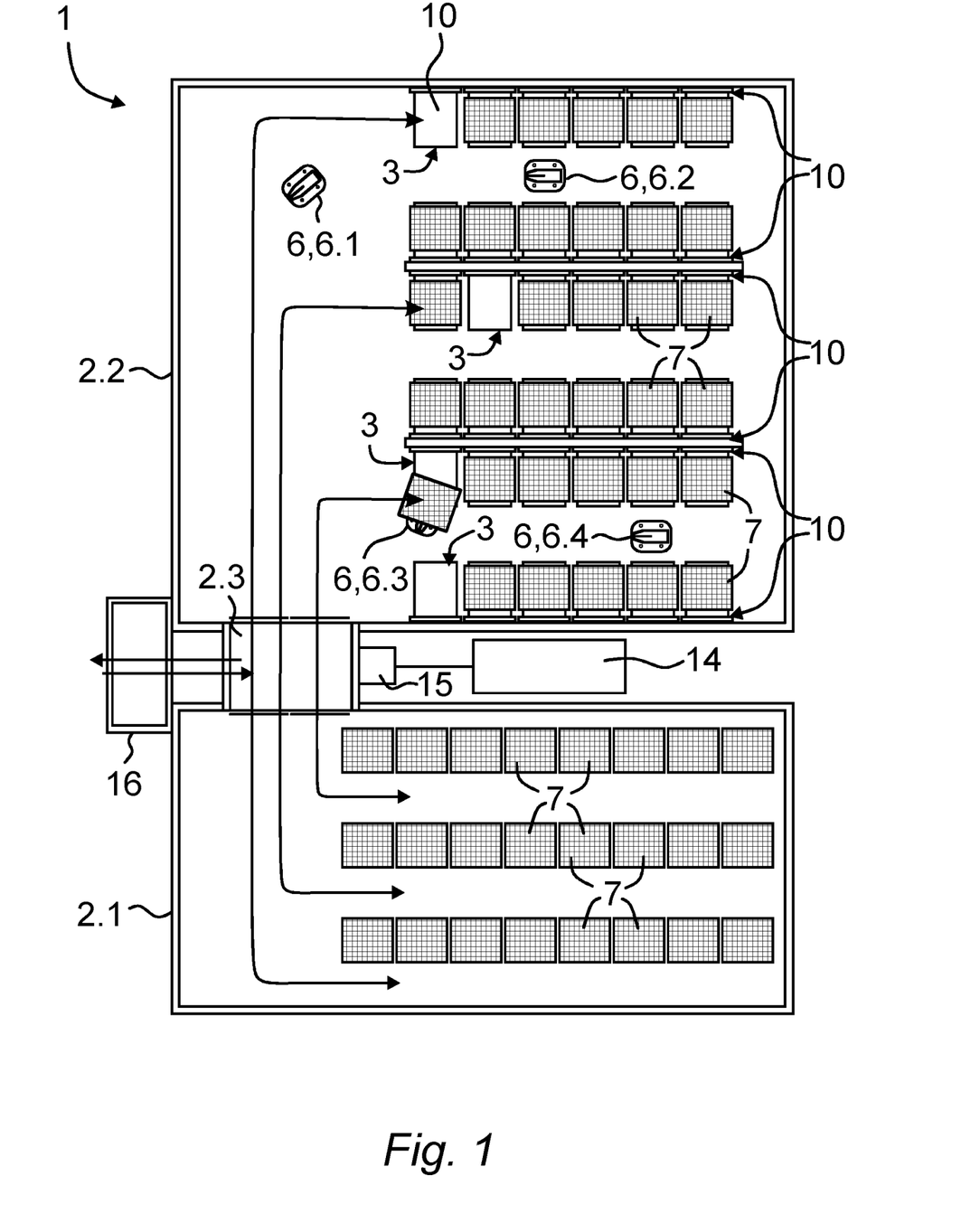
FIG. 1 is a schematic plan view of an embodiment of a greenhouse according to the principles of the present disclosure, with a first plant growth room and a second plant growth room.

With reference to FIG. 1, the basic method according to the principles of the present disclosure for the automated operation of a greenhouse 1 is explained in more detail below with reference to the greenhouse 1 shown schematically in a top view.

The greenhouse 1 has at least one first plant growth room 2.1, which is operated without artificial lighting. In addition, the greenhouse 1 has at least one second plant growth room 2.2 which is different from the first plant growth room 2.1 and which is equipped with artificial lighting means 3 for generating artificial light.

The method has the following steps:

automatically transporting back and forth (see arrows) of at least one plant carrier 5 (FIG. 5) equipped with plants 4 (FIG. 5) by means of an automatically controlled transport device 6 between the first plant growth room 2.1 and the second plant growth room 2.2, wherein the automatically controlled transport device 6 is designed and set up as follows:

to leave the at least one plant carrier 5 in the first plant growth room 2.1 for the duration of a first time segment, so that the plants 4 stored on the at least one plant carrier 5 develop in the first plant growth room 2.1 for the duration of the first time segment without the influence of artificial light, and to leave the at least one plant carrier 5 in the second plant growth room 2.2 for the duration of a second time segment different from the first time segment, so that the plants 4 stored on the at least one plant carrier 5 develop in the second plant growth room 2.2 for the duration of the second time segment under the influence of artificial light of the artificial lighting means 3.

In the case of the present exemplary embodiment, the automatically controlled transport device 6 comprises a plurality of vehicles 6.1 to 6.4, which can also be referred to as mobile robots.

In the case of the present exemplary embodiment in FIG. 1, the greenhouse 1 also has an analysis station 2.3 which is designed to record the biological state of plants 4 with regard to at least one biological parameter. The automatically controlled transport device 6 is or the several vehicles 6.1 to 6.4 or mobile robots are designed and set up to automatically transport the at least one plant carrier 4 from the first plant growth room 2.1 or from the second plant growth room 2.2 to the analysis station 2.3, so that the plants 4 stored on the at least one plant carrier 5 can be recorded at the analysis station 2.3 with regard to at least one biological parameter.

At the analysis station 2.3, the growth state of the plants 4, a pest infestation of the plants 4, a degree of moisture in the plant substrate of the plants 4 and/or a nutrient content of the plant substrate of the plants 4 can be recorded as biological parameters.

In the case of the present exemplary embodiment, the analysis station 2.3 is designed to detect the biological state of plants 4 with regard to at least one biological parameter when a plant carrier 5 with plants 4 is positioned at the analysis station 2.3, wherein the analysis station 2.3 has sensors 15 that are designed to automatically detect as biological parameters the growth state of the plants 4, a pest infestation of the plants 4, a degree of moisture in the plant substrate of the plants 4 and/or a nutrient content of the plant substrate of the plants 4.

The automatically operated greenhouse 1 accordingly has, in addition to the first plant growth room 2.1 and the second plant growth room 2.2, one or more supply devices 10 arranged in the second plant growth room 2.2. The automatically operated greenhouse 1 also comprises the multiple mobile shelf stands 7 and multiple ground-based vehicles 6.1 to 6.4. In addition, the automatically operated greenhouse 1 comprises at least one control device 14, which is designed and set up to automatically control the at least one ground-based vehicle 6.1 to 6.4 and the supply devices 10 arranged in the second plant growth room 2.2, in such a way that the greenhouse is operated according to a method as described according to the invention.

In the case of the present exemplary embodiment, the greenhouse 1 also has a loading station 16 which is designed to automatically accommodate plants 4, plant carriers 5 and/or mobile shelf stands 7 in the greenhouse 1 or to automatically remove them from the greenhouse 1, wherein the control device 14 is designed and set up to automatically transport the respective mobile shelf stand 7 by means of the at least one ground-based vehicle 6.1 to 6.4 from the first plant growth room 2.1 or the second plant growth room 2.2 to the load charging station 16 and automatically transport them back again from the loading station 16 into the first plant growth room 2.1 or the second plant growth room 2.2.

Figure 5:
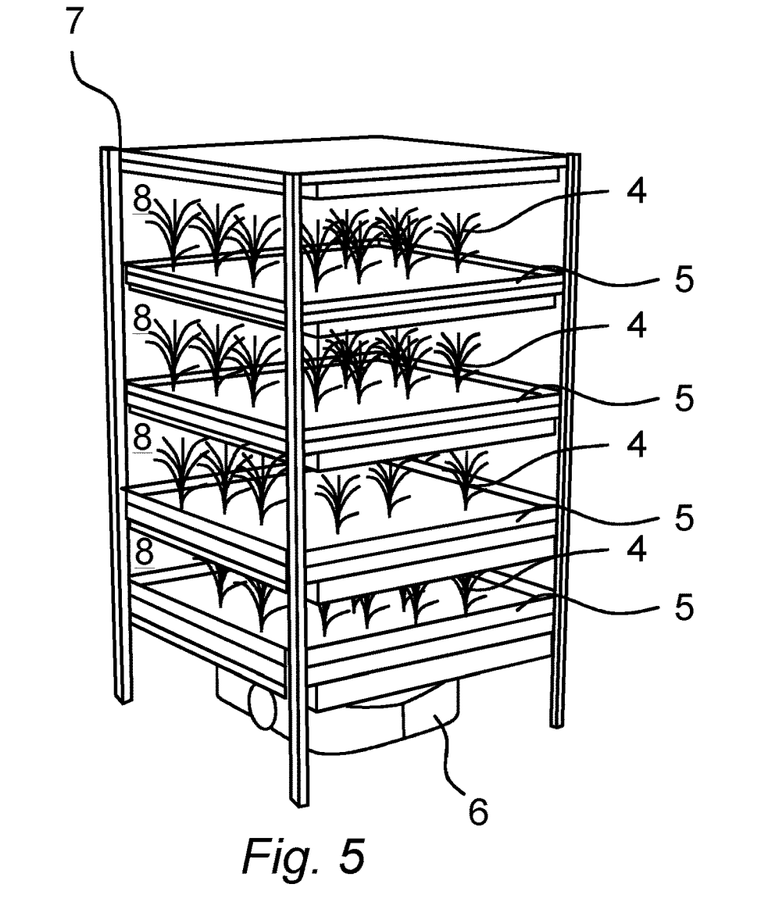
FIG. 5 is a schematic perspective representation of the plant carrier in the form of a mobile shelf stand together with an automatically controlled transport device according to the principles of the present disclosure.
Figure 6:
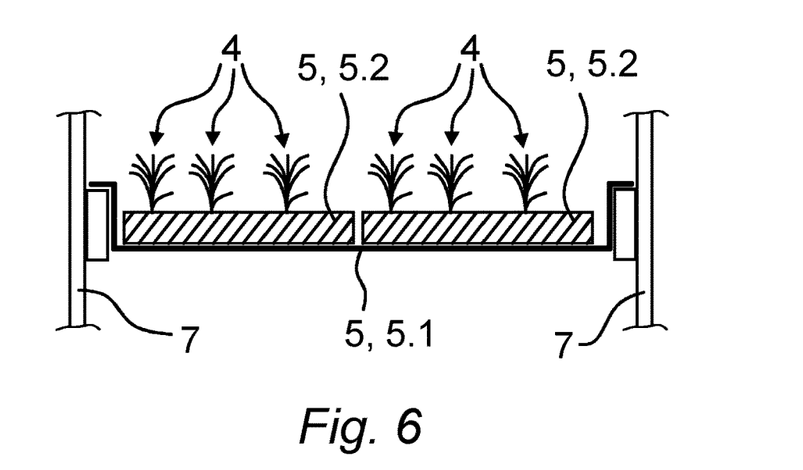
FIG. 6 is a schematic sectional view through a storage level of the mobile shelf stand according to FIG. 5 with a tub and two substrates with plants.
Figure 7:
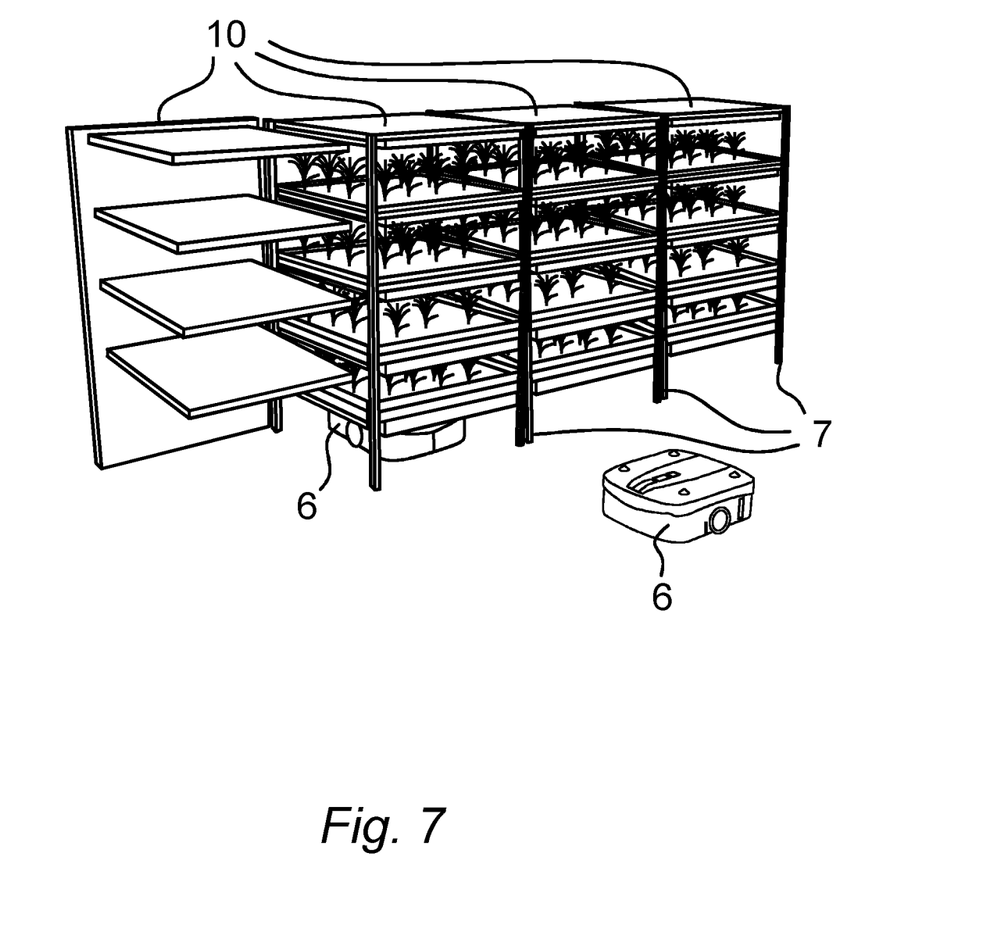
FIG. 7 is a schematic perspective illustration of an exemplary system arrangement of several supply devices, several plant carriers in the form of mobile shelf stands and several automatically controlled transport devices.

As can be seen in particular in FIG. 5, several plant carriers 5 equipped with several plants 4 can be stored in a mobile shelf stand 7. As can be seen in particular in the sectional illustration in FIG. 6, each plant carrier 5 can comprise a tub 5.1, which can be designed like a shell and/or with closed walls. The tubs 5.1 contain at least one substrate carrier 5.2, which in this respect forms the plant carrier 5 for the plants 4. The tubs 5.1 remain in the greenhouse 1 or on the mobile shelf stand 7, where, however, the plant carriers 5 designed as substrate carriers 5.2 can be removed from the tubs 5.1 and can be removed, for example, during a harvest. The plant carriers 5 can for example have a fixed frame, in particular an aluminum frame. The frame delimits a grid on which the plants 4 are arranged. The grid can be designed to be closely meshed. Each storage level can have a tub 5.1 or each storage level can be formed by a tub 5.1, in which one or more plant carriers 5, i.e. substrate carriers 5.2, can be stored. In this respect, the substrate carriers 5.2 can be removed from the trays 5.1. The substrate carriers 5.2 can, for example, have a frame and, as the bottom surface, a grid or a net, on which, for example, the plant substrate is applied. The plants 4 grow in the plant substrate.

The mobile shelf stand 7 has at least two, in the case of the exemplary embodiment shown in FIG. 5, exactly four storage levels for carrying plant carriers 5 and an access opening 8 between each two storage levels. The mobile shelf stand 7 can be transported as a transport device 6 into the second plant growth room 2.2 by means of one of the automatically controlled, ground-based vehicles 6.1 to 6.4. There the mobile shelf stand 7 is automatically moved by the vehicle 6.1 to 6.4 to a supply device 10 (FIGS. 2 to 4) positioned in the second plant growth space 2.2, in such a way that the supply means 9 (FIG. 3, 4) of the supply device 10 reach from outside the mobile shelf stand 7 via the access openings 8 of the mobile shelf stand 7 into the interior of the mobile shelf stand 7 so that the supply means 9 of the supply device 10 can supply the plants 4 present in the plant carriers 5 as long as the mobile shelf stand 7 is coupled to the supply device 10, as shown in FIG. 4.

Figure 2:
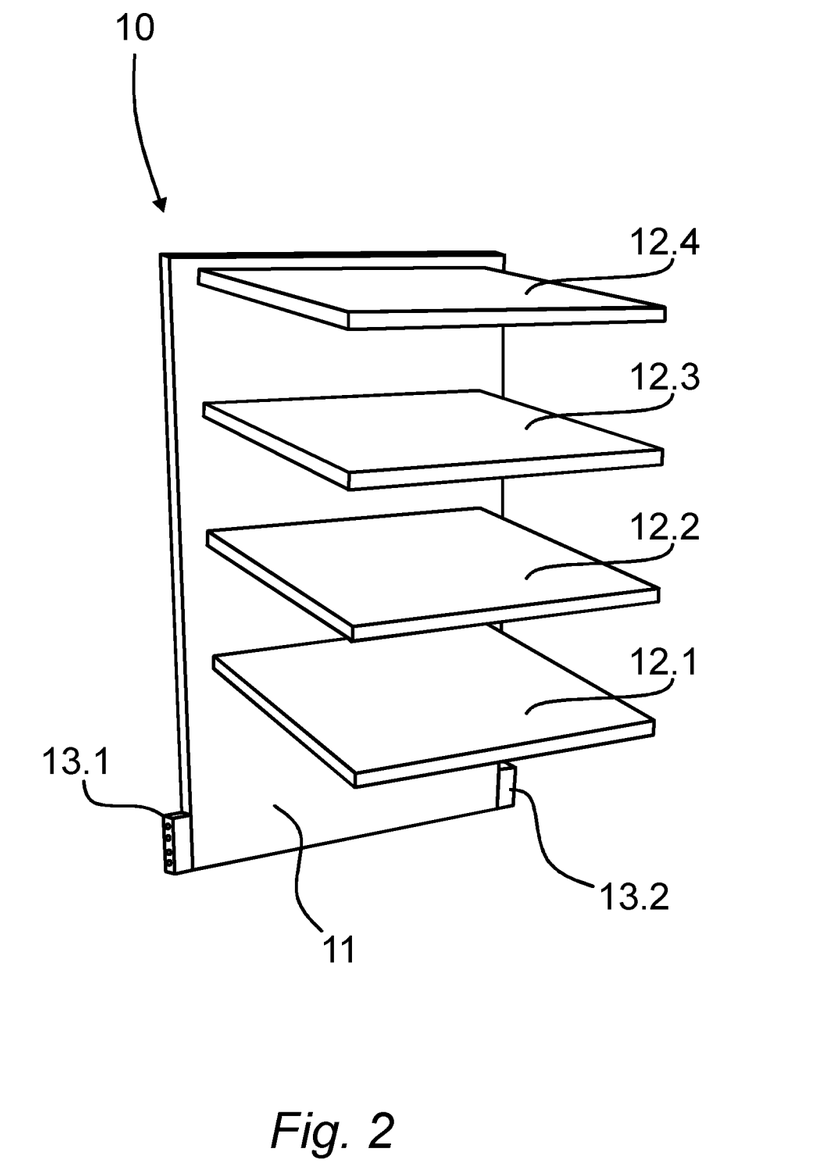
FIG. 2 is a schematic perspective illustration of a supply device according to the principles of the present disclosure in isolation.
Figure 3:
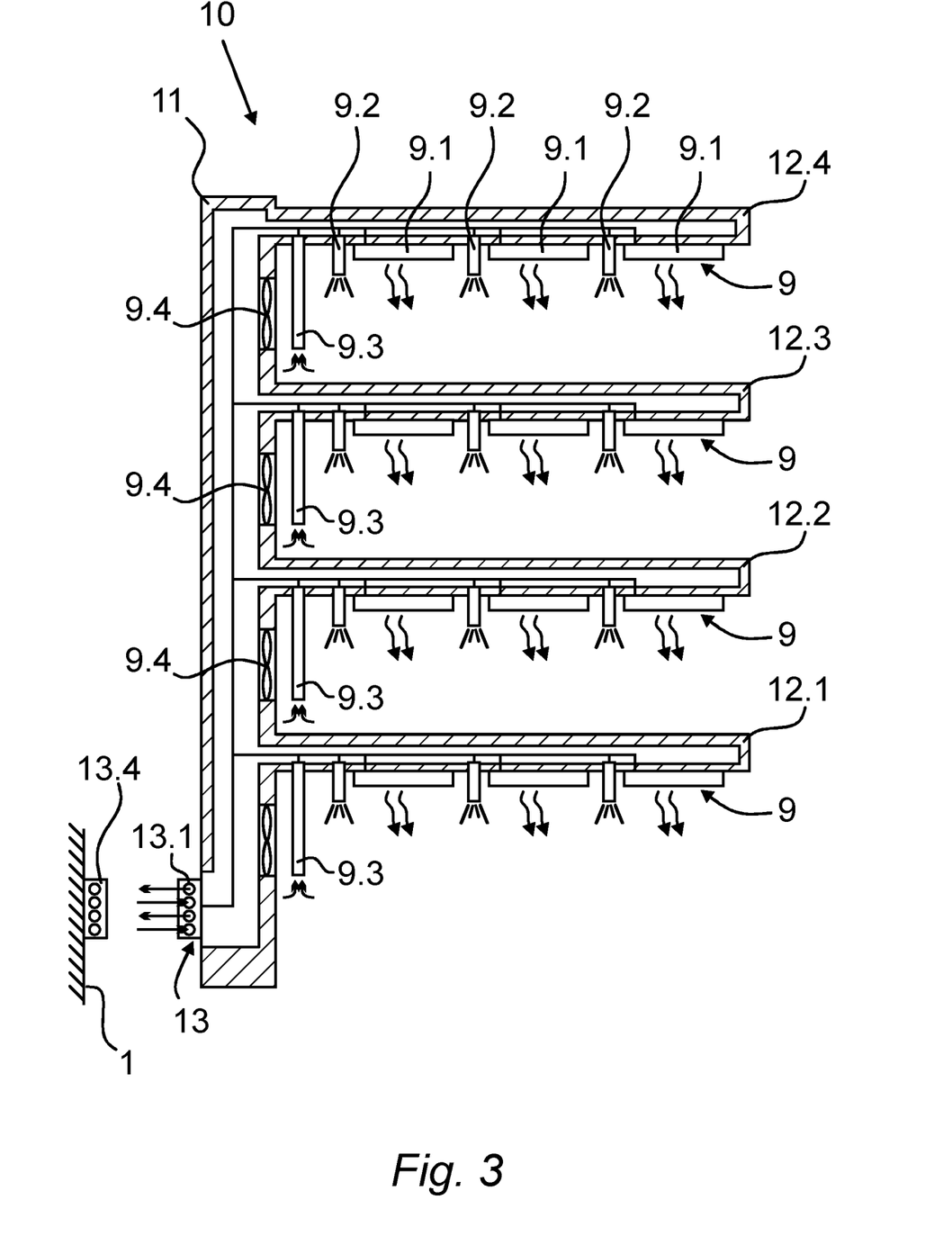
FIG. 3 is a schematic sectional view through the supply device according to FIG. 2 in isolation.
Figure 4:
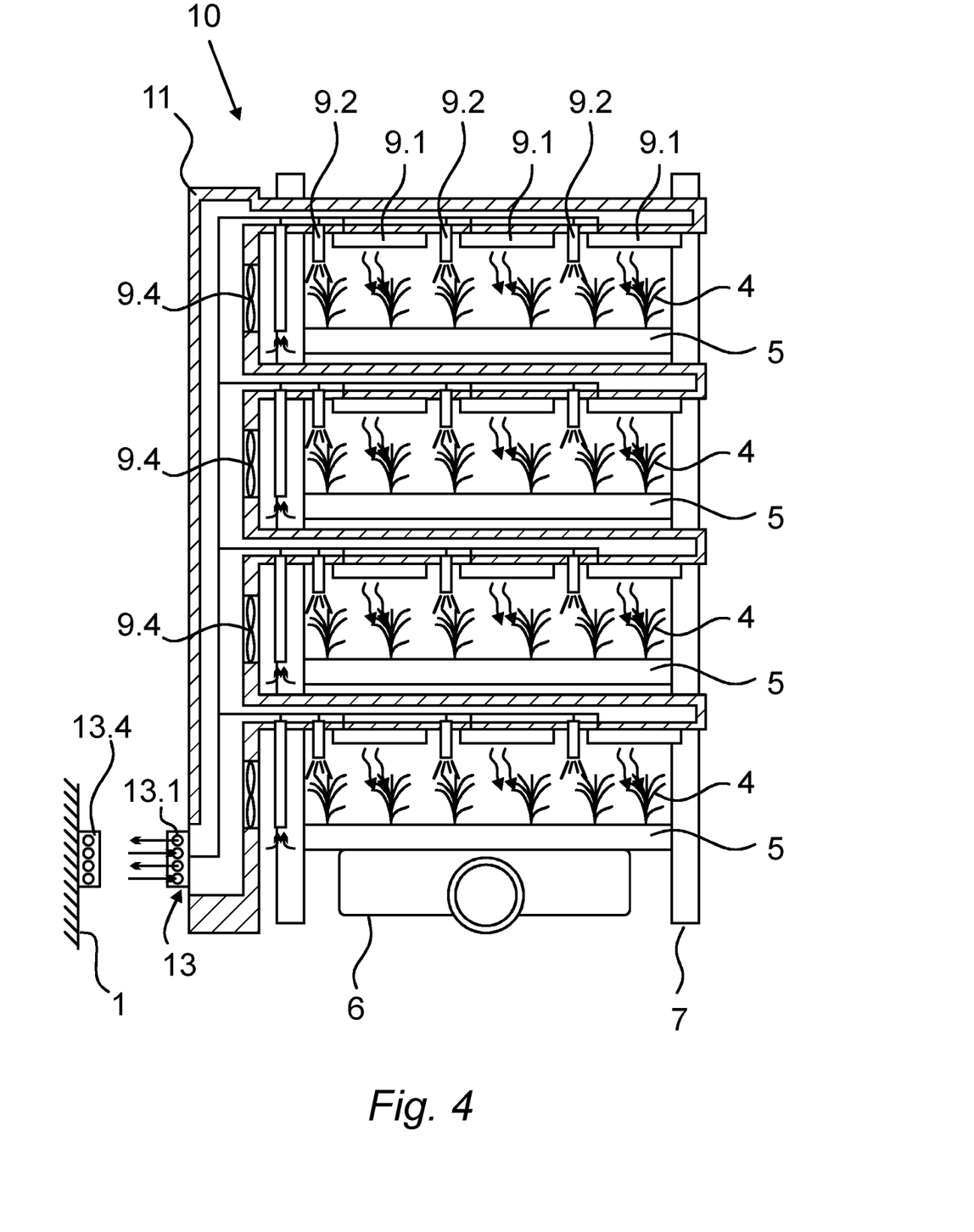
FIG. 4 is a schematic sectional view through the supply device according to FIG. 2 with a coupled plant carrier in the form of a mobile shelf stand.

The supply device 10 is shown in more detail in FIGS. 2 to 4. The supply device 10 comprises a base support 11, at least two cantilever beams 12.1, 12.2, 12.3, 12.4 arranged at different heights on the base support 11, of which each cantilever beam 12.1, 12.2, 12.3, 12.4 has at least one supply means 9 which is designed to act on one plant 4 or more plants 4 in a plant carrier 5 when the plant carrier 5 is coupled to the supply device 10 (FIG. 4), and at least one operating means connection 13 which is designed to provide at least one operating medium provided from a supply network for supplying the plants 4 to the supply means 9.

One of the operating means can be electrical energy and the supply means 9 can be at least one electrical lighting means 9.1, which is designed, operated by the electrical energy, to emit light in a light spectrum promoting plant growth in a direction in which the plants 4 are irradiated with this light when the plant carrier 5 with the plants 4 is coupled to the supply device 10.

In the illustrated embodiment, a supplementary second operating medium is water or a nutrient solution, wherein the supply means 9 is at least one outlet nozzle 9.2, which is designed to deliver the water or the nutrient solution, so that the plants 4 or a plant substrate of the plants 4 can receive the water or the nutrient solution when the plant carrier 5 with the plants 4 is coupled to the supply device 10. Each supply means 9 can be arranged vertically aligned as shown in the figures. In general, one or more of the supply means 9 can, however, deviate from the illustrated embodiment with a vertical arrangement, for example, also be designed rotated by 90 degrees in a horizontal arrangement. For example, instead of irrigating the plants 4 vertically from top to bottom, the outlet nozzles 9.2 can be designed to moisten the substrate horizontally from left to right at the level of the tubs 5.1 or at the level of the substrate carriers 5.2. Independently of this, the suction nozzles 9.3 can also suction from the side instead of from the bottom up. In addition, the air-conditioning nozzles 9.4 can also be designed, instead of generating a vertical air flow, as shown, to generate a horizontal air flow.

In the illustrated embodiment, a supplementary third operating means is a negative pressure, wherein the supply means 9 is at least one suction nozzle 9.3, which is designed to suction up wastewater or used nutrient solution from a plant substrate of the plants 4 when the plant carrier 5 with the plants 4 is coupled to the supply device 10.

In the illustrated embodiment, a supplementary fourth operating means is conditioned air and the supply means 9 is at least one air-conditioning nozzle 9.4, which is designed to emit conditioned air, so that the plants 4 are supplied with the conditioned air when the plant carrier 5 with the plants 4 is coupled to the supply device 10.

As can be seen in FIGS. 3 and 4, the supply device 10 has the operating means connection 13. The operating means connection 13 has at least one coupling means 13.1 which is designed, in a state coupled to a counter-coupling means 13.2 of the greenhouse 1 (FIG. 3) or to a counter-coupling means 13.3 of a further supply device 10, to connect the at least one supply means 9 of the supply device 10 to a supply network, so that the operating means can be supplied to the plants 4 via the supply means 9 when the plant carrier 5 with the plants 4 is coupled to the supply device 10.

As FIG. 2 also shows, the operating means connection 13 can be formed by at least one coupling means 13.1 and at least one counter-coupling means 13.3, so that two or more supply devices can be coupled to one another in series or in parallel (see FIG. 1) in order to be able to supply the two or several supply devices 10 with the operating means via a common supply network connection 13.4.

FIGS. 2 to 4 show how the supply device 10 can have at least two, in the case of the present exemplary embodiment exactly four, cantilever beams 12.1, 12.2, 12.3, 12.4 arranged on the base beam 11 at different heights, which are each designed as ceiling walls projecting from the base support 11 in a horizontal plane. The projecting ceiling walls have downwardly facing wall surfaces on which the supply means 9 are arranged in each case. The supply means 9 are designed to at least substantially cover the plant carrier 5 of the transport device 7 assigned in a reference plane when the plant carrier 5 with the plants 4 is coupled to the supply device 10, as shown in particular in FIG. 4.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A method for the automated operation of a greenhouse having at least one first plant growth room that is operated without artificial lighting, and at least one second plant growth room different from the first plant growth room and which is equipped with artificial light sources generating artificial light, the method comprising:
   automatically transporting at least one plant carrier equipped with plants, using an automatically controlled transport device, between the first plant growth room and the second plant growth room;
   wherein automatically transporting at least one plant carrier comprises:
   leaving the at least one plant carrier in the first plant growth room for the duration of a first time segment, so that the plants stored on the at least one plant carrier develop without the influence of artificial light during the first time segment in the first plant growth room, and
   leaving the at least one plant carrier in the second plant growth room for the duration of a second time segment different from the first time segment, so that the plants stored on the at least one plant carrier develop further under the influence of artificial light in the second plant growth room during the second time segment.

2. The method of claim 1, wherein the greenhouse has an analysis station configured to detect a biological state of plants with respect to at least one biological parameter, the method further comprising:
   automatically transporting the at least one plant carrier from the first plant growth room or from the second plant growth room to the analysis station using the automatically controlled transport device, so that the biological state of plants stored on the at least one plant support can be detected at the analysis station with respect to the at least one biological parameter.

3. The method of claim 2, further comprising:
   detecting at the analysis station at least one of a growth state of the plants, a pest infestation of the plants, a degree of moisture in a plant substrate of the plants, or a nutrient content of the plant substrate of the plants as the biological parameter.

4. The method of claim 1, wherein the at least one plant carrier equipped with plants is stored in a mobile shelf stand having at least two storage levels for carrying plant carriers, and having an access opening between the at least two storage levels, the method further comprising:

transporting the mobile shelf stand into the second plant growth room using an automatically controlled, floor-bound vehicle as the automatically controlled transport device;

automatically moving the mobile shelf stand to a supply device positioned in the second plant growth room using the floor-bound vehicle such that supply means of the supply device reach from outside the mobile shelf stand, beyond the access opening of the mobile shelf stand, and into the interior of the mobile shelf stand; and supplying the plants present in the plant carriers using the supply means of the supply device during the time the mobile shelf stand is coupled with the supply device.

5. The method of claim 4, wherein the supply device comprises a base support, at least two cantilever beams arranged at different heights on the base support, and at least one operating medium connection communicating with the supply means and configured to feed at least one operating medium provided from a supply network to the supply means for supplying the operating medium to the plants;

wherein the supply means comprises at least one respective supply means associated with each of the at least two cantilever beams configured to act on at least one plant in a plant carrier when the plant carrier is coupled to the supply device; and wherein supplying the plants present in the plant carriers using the supply means of the supply device during the time the mobile shelf stand is coupled with the supply device comprises supplying the at least one operating medium provided from the supply network to the plants via the at least one respective supply means associated with each of the at least two cantilever beams.

6. The method of claim 5, wherein the operating medium comprises electrical energy;

the supply means comprises at least one electrical lighting means which is configured, operated by the electrical energy, to send out a light spectrum that promotes plant growth in a direction in which the plants are irradiated with the light spectrum when the plant carrier with the plants is coupled to the supply device; and supplying the at least one operating medium provided from the supply network to the plants via the at least one respective supply means associated with each of the at least two cantilever beams comprises sending out the light spectrum when the plant carrier with the plants is coupled to the supply device.

7. The method of claim 5, wherein the operating medium comprises water or a nutrient solution;

the supply means comprises at least one outlet nozzle configured to deliver the water or the nutrient solution such that the plants or a plant substrate of the plants can absorb the water or the nutrient solution when the plant carrier with the plants is coupled to the supply device; and supplying the at least one operating medium provided from the supply network to the plants via the at least one respective supply means associated with each of the at least two cantilever beams comprises delivering the water or the nutrient solution to the plants or the plant substrate when the plant carrier with the plants is coupled to the supply device.

8. The method of claim 5, wherein the operating medium comprises a negative pressure;

the supply means comprises at least one suction nozzle configured to remove waste water or used nutrient solution from a plant substrate of the plants by suction when the plant carrier with the plants is coupled to the supply device; and supplying the at least one operating medium provided from the supply network to the plants via the at least one respective supply means associated with each of the at least two cantilever beams comprises removing the waste water or the used nutrient solution from the plant substrate when the plant carrier with the plants is coupled to the supply device.

9. The method of claim 5, wherein the operating medium comprises conditioned air;

the supply means comprises at least one air-conditioning nozzle configured to emit conditioned air so that the plants are acted upon with the conditioned air when the plant carrier with the plants is coupled to the supply device; and supplying the at least one operating medium provided from the supply network to the plants via the at least one respective supply means associated with each of the at least two cantilever beams comprises emitting conditioned air when the plant carrier with the plants is coupled to the supply device.

10. The method of claim 5, wherein the operating medium connection comprises at least one coupling means configured, in a state coupled to a counter-coupling means of a greenhouse or to a further supply device, to connect the at least one supply means of the supply device to a supply network so that the operating medium can be supplied to the plants via the supply means when the plant carrier with the plants is coupled to the supply device; and the method further comprises connecting the at least one coupling means to the counter-coupling means.

11. The method of claim 5, wherein supplying the at least one operating medium provided from the supply network to the plants via the at least one respective supply means associated with each of the at least two cantilever beams comprises forming the operating medium connection by connecting at least one coupling means and at least one counter-coupling means so that two or more supply devices are coupled to one another in series or in parallel such that two or more supply devices are supplied with the operating medium via a common supply network connection.

12. The method of claim 5, wherein the at least two cantilever beams arranged on the base support at different heights are formed by ceiling walls projecting from the base beam in a horizontal plane;

each ceiling wall includes a downward-facing wall surface on which the at least one respective supply means is arranged and which is configured to at least substantially cover the plant carrier of a transport device assigned in a reference plane when the plant carrier with the plants is coupled to the supply device; and supplying the at least one operating medium provided from the supply network to the plants via the at least one respective supply means associated with each of the at least two cantilever beams comprises supplying the at least one operating medium provided from the supply network to the plants via the at least one respective supply means arranged on the downward-facing wall surface of the respective ceiling wall.

* * * * *